H. F. STANLEY.
APPARATUS FOR CHILLING AND CARBONATING BEER AND THE LIKE.
APPLICATION FILED MAR. 1, 1909.

955,108.

Patented Apr. 12, 1910.

WITNESSES
W. P. Burk
A. F. Heuman

INVENTOR
Harry Frank Stanley

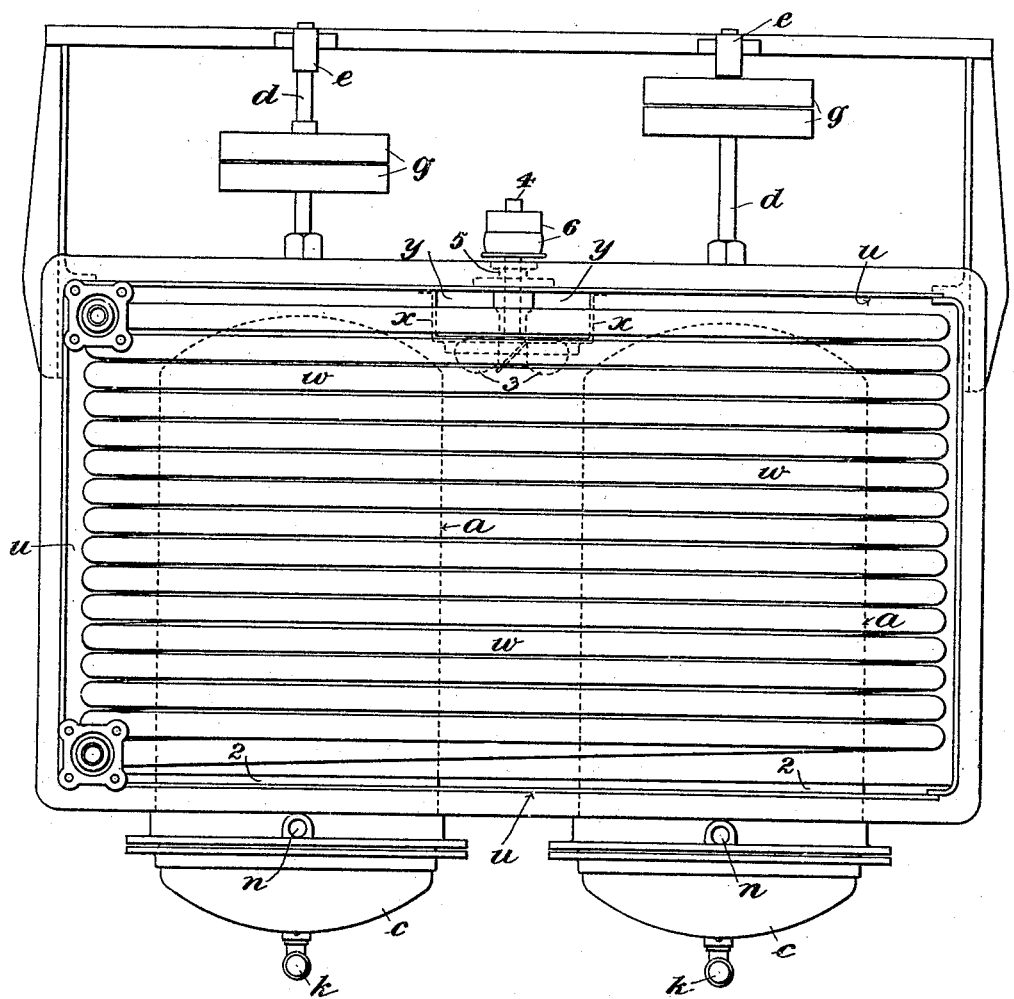

UNITED STATES PATENT OFFICE.

HARRY FRANK STANLEY, OF LONDON, ENGLAND, ASSIGNOR OF ONE-HALF TO THE FARRINGDON WORKS AND H. PONTIFEX AND SONS, LIMITED, OF LONDON, ENGLAND.

APPARATUS FOR CHILLING AND CARBONATING BEER AND THE LIKE.

955,108.      Specification of Letters Patent.      Patented Apr. 12, 1910.

Application filed March 1, 1909. Serial No. 480,633.

*To all whom it may concern:*

Be it known that I, HARRY FRANK STANLEY, a subject of the King of Great Britain, residing at London, England, have invented new and useful Improved Apparatus for Chilling and Carbonating Beer and the Like, of which the following is a specification.

This invention relates to improvements in that description of apparatus for chilling and carbonating beer and other like beverages in which two or any other convenient number of horizontally disposed cylindrical beer chambers are mounted in a tank containing brine or other cooling medium. The inner end of each of the said beer chambers is closed, but the outer end projects through the front of the brine tank and is furnished with a removable end cover, suitable connections and valves being provided for the introduction and withdrawal of the beer or other liquid to be treated, and also for the introduction and regulation of the carbonating gas. A central longitudinal shaft supported in suitable bearings carries blades or agitators for agitating the beer, and thereby facilitating the chilling and carbonating operations.

The brine or other cooling medium has heretofore been maintained at the required temperature in such an apparatus either by causing cold brine to flow into the tank from separate refrigerating apparatus and to be again returned to the refrigerating apparatus after it has cooled the beer cylinders by its contact with the outer surfaces thereof, or by submerging in the brine chamber, in the space surrounding the beer cylinders, one or more expansion coils through which is circulated an expansible gas.

Figure 1:
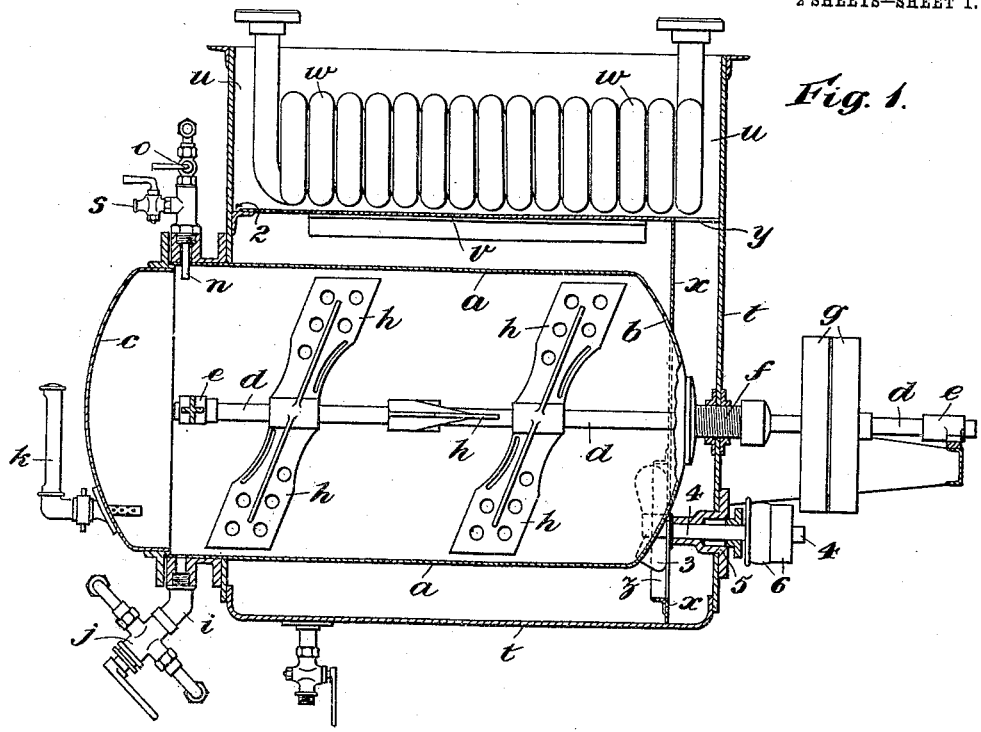
Figure 2:
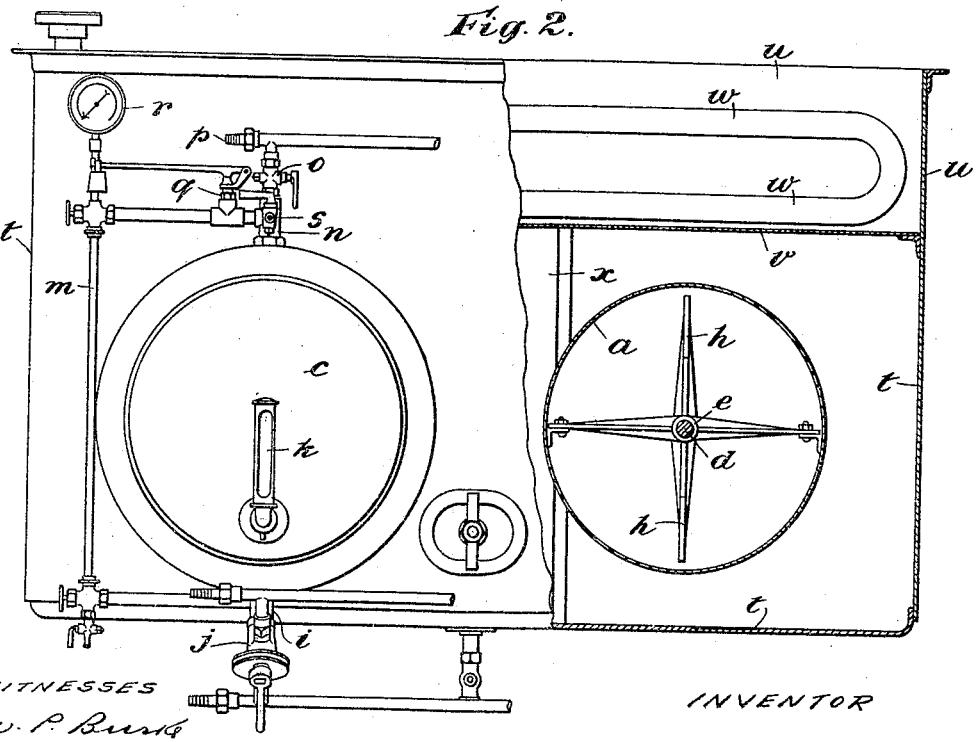

The accompanying drawings illustrate the improvements which form the subject of the present invention, Figure 1 being a longitudinal section through one of the beforementioned cylindrical chambers mounted in a brine tank; Fig. 2 an end elevation of two such chambers and the tank containing the same; and Fig. 3 a plan of Figs. 1 and 2.

$a$ are the cylindrical chambers for containing the beer (for example) to be cooled and carbonated, $b$ the closed end of one of such chambers, $c$ the removable end cover, $d$ the central longitudinal shaft running in bearings $e$, passing through the stuffing box $f$, and provided with fast and loose pulleys $g$.

$h$ are the blades or agitators for agitating the beer, mounted upon the shaft $d$.

$i$ is the beer inlet and outlet pipe governed by the three-way cock $j$.

$k$ is a thermometer for indicating the temperature of the beer, and $m$ is a gage for indicating the level thereof.

$n$ is the gas inlet regulated by the cock $o$, $p$ the connection for the gas bottle, $q$ a safety valve, $r$ a pressure gage, and $s$ an air blow-off cock.

$t$ is a tank in which the chambers $a$ are mounted and which contains the brine or other cooling medium. This tank is provided with a separate cooling compartment or upward extension $u$ of the brine tank $t$ the bottom $v$ of the compartment $u$ forming the top of the brine chamber $t$ as heretofore employed. Into this separate compartment $u$ is placed one or more expansion coils $w$ which cool the brine in the said compartment. A vertical partition $x$ extends between the bottom $v$ of the compartment $u$ and the bottom of the brine tank $t$ at or toward the closed ends $b$ of the beer chambers $a$, and suitable openings $y$ are provided for the circulation of chilled brine from the compartment $u$ into the space between the vertical partition $x$ and the back of the brine tank $t$. The chilled brine then passes through the opening $z$ into the lower part of the brine tank $t$ whence it ascends in contact with the outer surfaces of the beer cylinders $a$ and passes through openings 2 in the front end of the bottom $v$ of the compartment $u$ where it is again cooled by its contact with the coil $w$ as it passes on its way to the openings $y$ at the back of the said compartment. This circulation of brine is preferably assisted by a screw-propeller 3 rotating in the opening $z$ at the lower end of the beforementioned vertical partition $x$, the shaft 4 of the said screw-propeller passing through a bearing and stuffing box 5 and being driven by pulleys 6 situated outside the brine tank $t$ as shown. Or in some cases the compartment for containing the expansion coil or coils $w$ may be situated at one side of the brine tank $t$ instead of at the top thereof.

By the employment of the above described arrangements the expansion coil or coils $w$ with their connections are always open to inspection, and are most readily accessible for removal or repairs, and the improved mechanical circulation of the brine insures a thorough and regular cooling of the beer cylinders $a$.

Claim.

An apparatus for cooling and carbonating liquids comprising in combination, a tank, a partition therein dividing said tank into upper and lower compartments, said partition having openings therein for the circulation of cooling liquid from one compartment of the tank to the other, horizontal cylindrical carbonating chambers located in the lower compartment and each having one end projecting through one wall of the tank, a removable cover on the said projecting end of each chamber, and an expansion coil in the upper compartment so arranged that it can easily be got at for inspection, repair, or removal without disturbing any other part of the apparatus, and means for effecting the said circulation of cooling liquid from one compartment of the tank to the other.

In testimony whereof I have signed my name to this specification in the presence of two subscribing witnesses.

HARRY FRANK STANLEY.

Witnesses:
WILLIAM ANDERSON SMITH,
H. D. JAMESON.